J. A. McCANN.
BRAKE SHOE.
APPLICATION FILED OCT. 21, 1918.

1,324,603.

Patented Dec. 9, 1919.
2 SHEETS—SHEET 1.

WITNESSES
Howard D. Orr.
F. F. Chapman.

J. A. McCann, INVENTOR,
BY E. G. Siggers
ATTORNEY

J. A. McCANN.
BRAKE SHOE.
APPLICATION FILED OCT. 21, 1918.
1,324,603.
Patented Dec. 9, 1919.
2 SHEETS—SHEET 2.
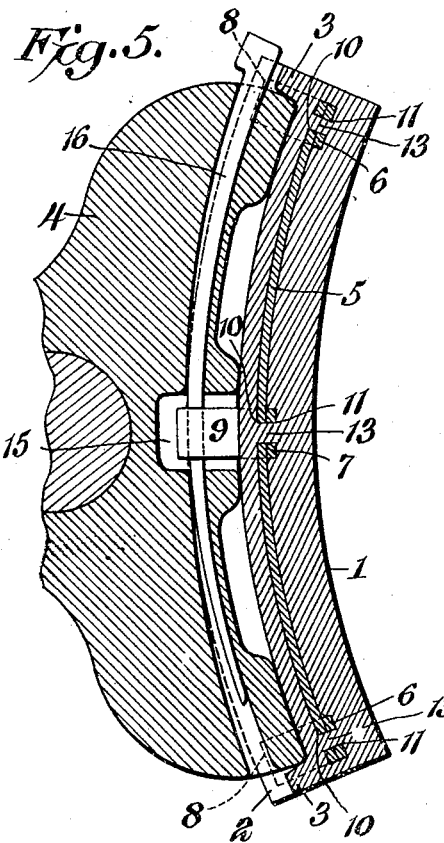
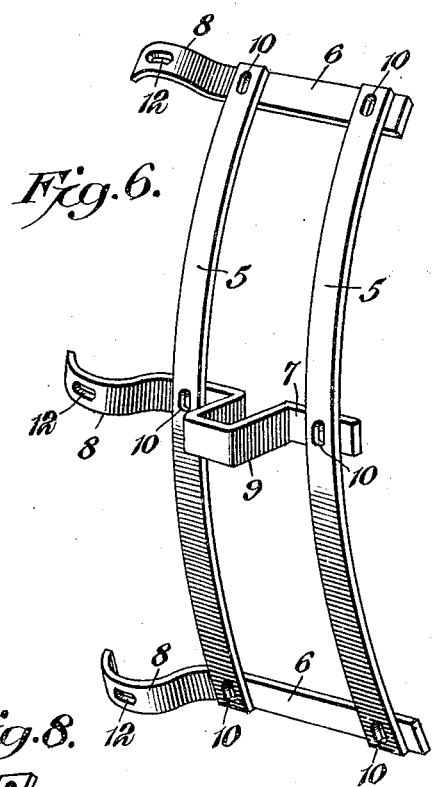
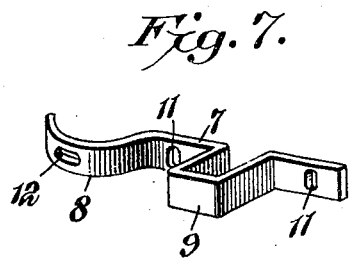
WITNESSES
Howard D. Orr.
H. T. Chapman.
J. A. McCann, INVENTOR,
BY E. G. Siggers
ATTORNEY

UNITED STATES PATENT OFFICE.

JOSEPH ALEXANDER McCANN, OF PADUCAH, KENTUCKY, ASSIGNOR OF ONE-HALF TO ROY WEAKS McKINNEY, OF PADUCAH, KENTUCKY.

BRAKE-SHOE.

1,324,603.      Specification of Letters Patent.      Patented Dec. 9, 1919.

Application filed October 21, 1918. Serial No. 259,046.

*To all whom it may concern:*

Be it known that I, JOSEPH A. McCANN, a citizen of the United States, residing at Paducah, in the county of McCracken and State of Kentucky, have invented a new and useful Brake-Shoe, of which the following is a specification.

This invention has reference to brake shoes, and its object is to provide a reinforced brake shoe for either bald or flanged wheels, which brake shoe is not weakened at any vital point by having to fit the brake shoe to a brake head.

In accordance with the invention, the brake shoe may be made of cast metal with the reinforcement of wrought metal or steel, the reinforcement being built up of crossed straps with matching perforations and with the body of the brake shoe cast about the reinforcement so that the metal in casting flows through the perforations, thereby providing anchors integral with the body of the brake shoe, and thus uniting the crossed straps and making the brake shoe practically integral throughout. The construction contributes materially to the strength of the brake shoe, for even if the body of the brake shoe becomes cracked there is practically no liability of the parts separating.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Fig. 5 is a longitudinal section of the brake shoe and head to which it is attached, taken to one side of the attaching strap or lug.

Fig. 6 is a perspective view of the reinforcement separate from the brake shoe and shaped for insertion in a brake shoe adapted to a flanged wheel.

Fig. 7 is a perspective view of that member of the reinforcement containing the attaching lug.

Fig. 8 is a perspective view of one of the longitudinal straps or bars of the reinforcement.

Fig. 9 is a perspective view of one of the end cross straps or bars of the reinforcement.

Figure 1:
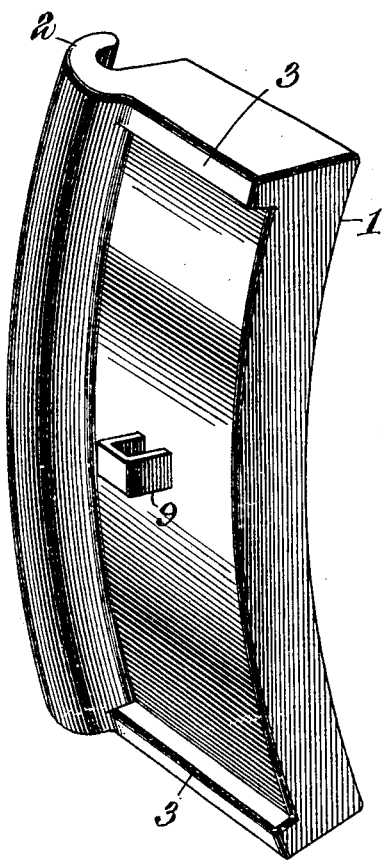
Figure 1 is a perspective view of a brake shoe constructed in accordance with the invention.
Figure 2:
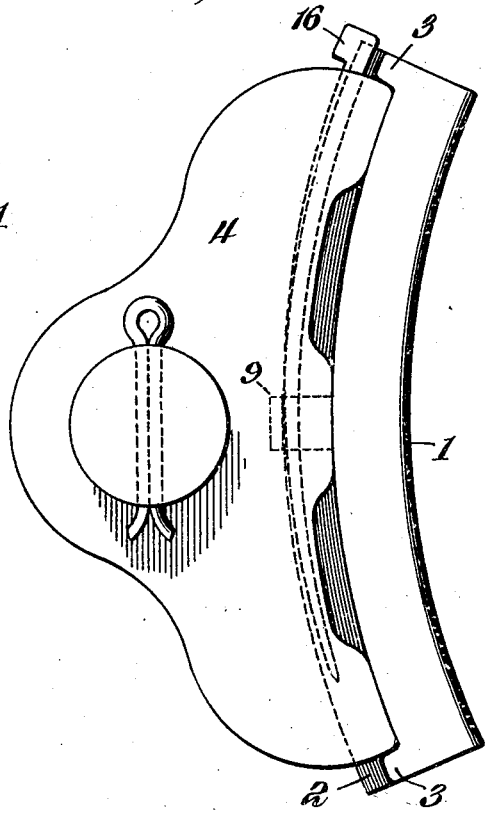
Fig. 2 is a side view of the brake shoe of Fig. 1 as applied to a brake head.
Figure 3:
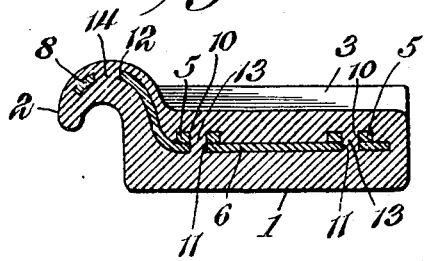
Fig. 3 is a cross section through the brake shoe on a line of intersecting perforations in the reinforcing strips.
Figure 4:
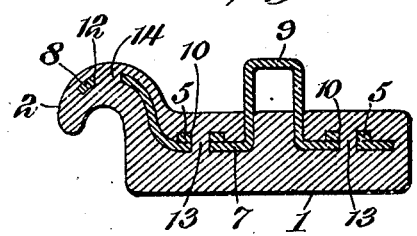
Fig. 4 is a similar section through the portion of the brake shoe containing the attaching strap.

Referring to the drawings, there is shown a brake shoe 1, the particular form of brake shoe shown being that adapted for a flanged wheel and provided along one edge with a return lip 2 for partially embracing the wheel flange. At each end of the body 1 is an outstanding flange or rib 3 constituting an abutment for the end portions of a brake head 4, which latter may be of the usual construction and therefore needs no special description.

The brake shoe 1 is formed of cast metal, usually cast iron, and so far as the general shape is concerned may follow the usual custom. Embedded in the body of the brake shoe on the side thereof to be attached to the brake head is a reinforcement shown in the drawings as comprising spaced longitudinal strips or straps 5 and cross straps 6 and 7 respectively. These straps, which may be made of wrought metal or steel, each terminate at one end, in the particular form shown in the drawings, in a curved extension 8 conforming to the return lip 2 of the brake shoe. The strap 7 is formed with an intermediate open loop 9, which constitutes the attaching lug of the brake shoe and is the only part of the reinforcement not entirely embedded in the body of the brake shoe.

Where the longitudinal straps 5 cross the straps 6 and 7 they are provided with perforations 10 elongated in the direction of the length of the straps 5. Similarly the straps 6 and 7 are provided with perforations 11 elongated crosswise of the respective straps. The end portion 8 of each strap 6 and 7 has a perforation 12 elongated in the direction of the length of the respective strap.

The longitudinal strips or straps 5 are located in the shoe near opposite long edges thereof, the cross straps or strips 6 are located in the shoe near the ends thereof and the cross strap or strip 7 is located in the shoe about intermediately of its length. The strips 5, 6 and 7 are so located that the perforations 10 and 11 match each other.

The reinforcing structure is properly located in a mold and the metal is poured into the mold about the reinforcing structure so as to embed the latter, leaving ample thickness of metal for wear on the engaging face of the shoe. The lug 9 projects from the rear face of the shoe for the attachment of the latter to the brake head.

When the metal is cast about the reinforcement certain portions 13 flow through the matching perforations 10 and 11, thereby forming integral anchors, for the reinforcing straps, holding them rigidly in intimate contact. Similarly anchors 14 are formed through the perforations 12 in the extensions 8 embedded in the lip 2. The attaching lug 9 enters a recess 15 in the head 4 and is held to the head 4 by a wedge pin 16.

By coating the reinforcing straps or strips with a suitable flux the cast metal may be made to adhere firmly to the strips and by providing integral anchors formed by the flow of the metal through the perforations in the strips, the whole reinforcement is intimately united with the body of the brake shoe and even should the brake shoe become cracked the parts are so firmly adherent as to hold their positions with relation to each other under conditions of use.

In locating the lateral strips it is better to place them, and especially the strip 7, on that side of the longitudinal strips toward the face of the shoe engaging the wheel. This is because any strains brought upon the shoe, and hence upon the attachment lug, might result in pulling the strip 7 away from the longitudinal strips were it not for the fact that these longitudinal strips are placed on that side of the strip 7 remote from the attachment lug.

What is claimed is:—

1. A brake shoe provided with embedded reinforcing strips in crossed relation to each other and sunk into the body of the shoe between the front and rear surfaces thereof and where crossed having matching perforations traversed by the material of the body of the brake shoe and constituting anchors for the strips integral with the brake shoe body.

2. A brake shoe provided with embedded reinforcing strips in crossed relation and having matching perforations where crossing, said reinforcing strips being sunk into the body of the brake shoe in spaced relation to both the inner and outer faces of said body and integrally joined to the body of the brake shoe on opposite sides of the crossed reinforcing strips.

3. A brake shoe provided with longitudinally arranged laterally spaced reinforcing strips embedded in the body of the brake shoe in spaced relation to both the inner and outer faces thereof, and other reinforcing strips in transverse relation to the brake shoe and in face to face engagement with the first named strips on the face of the latter toward the inner face of the shoe, the longitudinal and transverse strips, where engaged, being provided with matching perforations traversed by material of the body of the shoe and constituting anchors and integrally joined at both ends to the body of the shoe.

4. A brake shoe provided with longitudinally arranged laterally spaced reinforcing strips in and wholly surrounded by the body of the brake shoe and other reinforcing strips in transverse relation to the brake shoe in face engagement with the first named strips, said longitudinal and transverse strips where crossing being provided with matching perforations traversed by anchors integrally joined at both ends to the body of the brake shoe and said matching perforations being longer in one direction than in the other direction.

5. A brake shoe having a body of cast metal and a reinforcement embedded and sunken into the brake body below the outer face thereof, said reinforcement comprising longitudinal and laterally arranged spaced strips crossing each other, and anchors extending through the strips where engaged and integrally joined at the ends to the body of the brake shoe, the brake shoe having a body portion formed with a return lip along one edge to engage the flange of the wheel, and reinforcing strips sunken into the brake shoe and return lip below the outer surface thereof, certain of the strips extending lengthwise of the brake shoe and other of the strips extending crosswise of the brake shoe and into the return lip and conforming to the shape thereof, the strips where crossing having matching perforations with the material of the body of the brake shoe extending into the perforations and there constituting anchors integral at the ends with the body of the brake shoe.

In testimony, that I claim the foregoing as my own, I have hereto affixed my signature.

JOSEPH ALEXANDER McCANN.

Witnesses:
 FRANK B. SMITH,
 R. B. BAKER.